United States Patent
McKinstrie

(10) Patent No.: US 7,436,580 B2
(45) Date of Patent: Oct. 14, 2008

(54) OPTICAL BUFFER EMPLOYING FOUR-WAVE MIXING

(75) Inventor: Colin J. McKinstrie, Manalapan, NJ (US)

(73) Assignee: Lucent Technologies Inc, Murray Hill, NJ (US)

( * ) Notice: Subject to any disclaimer, the term of this patent is extended or adjusted under 35 U.S.C. 154(b) by 0 days.

(21) Appl. No.: 11/646,190

(22) Filed: Dec. 27, 2006

(65) Prior Publication Data

US 2008/0158656 A1    Jul. 3, 2008

(51) Int. Cl.
*G02F 2/02* (2006.01)
*H04B 10/12* (2006.01)

(52) U.S. Cl. ............... 359/330; 359/326; 359/341.3
(58) Field of Classification Search ............ None
See application file for complete search history.

(56) References Cited

U.S. PATENT DOCUMENTS

2004/0042060 A1 *  3/2004  McKinstrie et al. ......... 359/330

FOREIGN PATENT DOCUMENTS

WO    WO 2006102074 A2 *  9/2006

OTHER PUBLICATIONS

S. Radic; C.J. McKinstrie; R.M. Jopson; A.H. Gnauck; J.C. Centanni; A.R. Chraplyvy, "Multiple-band bit-level switching two-pump fiber parametric devices," Photonics Technology Letters, IEEE , vol. 16, No. 3, pp. 852-854, Mar. 2004.*
"*Selective Suppression of Idler Spectral Broadening in Two-Pump Parametric Architectures*," by Stojan Radic et al., IEEE Photonics Technology Letters, vol. 15, No. 5, May 2003, pp. 673-675.
"*Optical Cell Synchronisation in an ATM Optical Switch*," by M. Burzio et al., Proc. ECOC 1994, pp. 581-584.

* cited by examiner

*Primary Examiner*—Hemang Sanghavi
*Assistant Examiner*—Omar Rojas

(57) ABSTRACT

An optical buffer employing Bragg scattering (BS), in which two pump signals are combined with an input (data) signal in a four-wave mixing (FWM) medium to frequency convert the input signal into an idler signal, which is applied to a dispersive medium, in which the idler signal propagates at a speed different from that of the input signal. By selectively turning on and off a pump, e.g., at bit-level switching rates, the BS-based frequency conversion can be selectively performed on particular bits in the input signal, e.g., to generate an output signal having reordered bits. A BS-based optical buffer can (1) be tuned to achieve different amounts of delay; (2) support single-channel or multiple-channel, classical or quantal communications; (3) be implemented with co-phased pump-phase modulation to suppress stimulated Brillouin scattering, while inhibiting spectral broadening of the idler signal; and (4) provide polarization independence using standard polarization-diversity techniques.

8 Claims, 3 Drawing Sheets

OPTICAL BUFFER EMPLOYING FOUR-WAVE MIXING

BACKGROUND OF THE INVENTION

1. Field of the Invention

The invention relates to optical communications, and, in particular, to optical buffers employing four-wave mixing.

2. Description of the Related Art

All-optical communication systems have the potential to transmit information at bit rates higher than 10 Gb/s. Such systems employ tunable optical buffers, i.e., delay elements, with bit-level control, to implement bit-interleaved or packet-interleaved multiplexing, and to prevent conflicts among different bit streams at optical switches. M. Burzio, P. Cinato, R. Finotti, P. Gambini, M. Puleo, E. Vezzoni, and L. Zucchelli, "Optical cell synchronisation in an ATM optical switch," Proc. ECOC 1994, pp. 581-584, the teachings of which are incorporated herein by reference, describe an optical buffer employing opto-electronic frequency conversion. J. E. Sharping, Y. Okawachi, J. van Howe, C. Xu, Y. Wang, A. E. Willner, and A. L. Gaeta, "All-optical, wavelength and bandwidth preserving, pulse delay based on parametric wave-length conversion and dispersion," Opt. Express 13, 7872-7877 (2005), the teachings of which are incorporated herein by reference, describe an optical buffer employing modulation interaction (MI), a particular type of four-wave mixing (FWM), in a fiber.

Four-wave mixing is a parametric interaction in which two input photons are destroyed and two different, output photons are created. FIG. 1 illustrates three different types of FWM: modulation interaction (MI), phase conjugation (PC), and Bragg scattering (BS), which is also referred to as frequency conversion (FC). In FIG. 1, $\omega_{1+}$ represents the frequency of an input (data) signal having photons $\gamma_{1+}$, $\omega_1$ represents the frequency of light from a first pump ($P_1$) having photons $\gamma_1$, $\omega_2$ represents the frequency of light from a second pump ($P_2$) having photons $\gamma_2$, and $\omega$ represents the frequency difference between the input signal and the first pump wave (i.e., $\omega=\omega_{1+}\sim\omega_1$, where the symbol "~" means minus). In FIG. 1, input signal $\omega_{1+}$ is a sideband signal relative to pump signals $\omega_1$ and $\omega_2$, where $\omega_{1-}$, $\omega_{2-}$, and $\omega_{2+}$ represent the frequencies of the remaining three sideband signals, which are also referred to as idler signals (because they are usually generated by the FWM process). In conventional optoelectronics parlance, input signal $\omega_{1+}$ is referred to simply as a "signal," pump signals $\omega_1$ and $\omega_2$ are referred to simply as "pumps," and idler signals $\omega_{1-}$, $\omega_{2-}$, and $\omega_{2+}$ are referred to simply as "idlers." Although pump signals are inputs in FWM processes, the term "input signal" as used in this specification will be understood to refer to a "signal" of conventional optoelectronics parlance and not to a "pump."

In MI, a single pump wave $\omega_1$ interacts with the input signal $\omega_{1+}$ according to $2\gamma_1 \to \gamma_{1-}+\gamma_{1+}$, such that two pump photons $2\gamma_1$ are destroyed, and one signal photon $\gamma_{1+}$ and one idler photon $\gamma_{1-}$ are created, where $\omega_{1-}=(\omega_1\sim\omega)$. In PC, two pump waves $\omega_1$ and $\omega_2$ interact with the input signal $\omega_{1+}$ according to $\gamma_1+\gamma_2 \to \gamma_{1+}+\gamma_{2-}$, such that two pump photons $\gamma_1$ and $\gamma_2$ are destroyed, and one signal photon $\gamma_{1+}$ and one idler photon $\gamma_{2-}$ are created, where $\omega_{2-}=(\omega_2\sim\omega)$. In BS, two pump waves $\omega_1$ and $\omega_2$ interact with the input signal $\omega_{1+}$ according to $\gamma_{1+}+\gamma_2 \to \gamma_1+\gamma_{2+}$, such that one signal photon $\gamma_{1+}$ and one pump photon $\gamma_2$ are destroyed, and one pump photon $\gamma_1$ and one idler photon $\gamma_{2+}$ are created, where $\omega_{2+}=(\omega_2+\omega)$. The value of the zero-dispersion frequency (ZDF) of the fiber in which the parametric interaction occurs, relative to the pump and signal frequencies, determines which type or types of FWM occur within the fiber.

The MI-based optical buffering described by Sharping et al. is a three-step process. First, MI is used to generate an idler pulse (e.g., $\omega_{1-}$) that is the frequency converted (FC) image of the input signal pulse (e.g., $\omega_{1+}$). Second, the idler is sent through a dispersive medium, such as a fiber. Third, MI is again used, this time to generate an output idler with the same frequency as the input signal. Because of dispersion, the output idler is delayed by an amount that is proportional to the frequency difference (i.e., $\omega_{1+}\sim\omega_{1-}$) between the signal and intermediate idler.

There are (at least) three reasons why MI-based optical buffers are poor choices for communication systems: (1) their ability to controllably vary the delays is limited, (2) they are not suitable for multiple-channel systems, e.g., wavelength-division-multiplexed (WDM) systems, and (3) they generate low-quality output idlers.

In principle, one can vary the idler delay by varying the frequency difference between the input signal and the idler. In practice, the extent to which one can do this in MI-based optical buffers is limited. Suppose that the signal frequency $\omega_{1+}$ is fixed. If one were to vary the pump frequency $\omega_{1+}$, one would vary the idler frequency $\omega_{1-}=2\omega_1\sim\omega_{1+}$. However, one would also vary the MI gain, which depends sensitively on the difference between the pump frequency and the ZDF of the fiber. For typical parameters, the constraint of nearly constant gain limits the pump and idler wavelengths to tuning ranges of a few nm.

Because the idler frequency $\omega_{1-}$ equals $2\omega_1\sim\omega_{1+}$, the input signal-idler frequency difference $\omega_{1+}\sim\omega_{1-}$ equals $2(\omega_{1+}\sim\omega_1)$, which depends on the signal frequency $\omega_{1+}$. As a result, signals in different channels experience different frequency shifts and, hence, different time delays. Hence, MI buffers are not suitable for use in WDM systems.

In many parametric devices, the pump powers exceed the stimulated Brillouin scattering (SBS) threshold by a wide margin. To circumvent SBS, pumps are phase-modulated to broaden their spectra and reduce the powers of their spectral component below the SBS threshold. Let the pump frequency be $\omega_1+\delta\omega_1$, where $\omega_1$ is the average pump frequency, which is constant, and $\delta\omega_1$ is the slowly varying perturbation to the pump frequency associated with phase modulation. Then, the idler frequency $\omega_{1-}$ equals $2(\omega_1+\delta\omega_1)\sim\omega_{1+}$. The MI idler inherits twice the phase modulation of the pump, and the dispersive fiber converts phase modulation into amplitude modulation. As a result, MI buffers generate low-quality output idlers.

MI amplifies the signal and generates a strong idler. However, with amplification comes noise. The addition of noise photons to a classical (i.e., many-photon) signal would not perturb the signal significantly and, hence, would not prevent the use of an MI buffer in a classical communication system. However, the addition of noise photons would perturb significantly the state of a quantal (i.e., few-photon) signal. Hence, MI buffers are not suitable for use in quantal communication systems.

SUMMARY OF THE INVENTION

Problems in the prior art are addressed in accordance with the principles of the invention by an optical buffer employing Bragg scattering, a particular type of four-wave mixing (FWM).

In one embodiment, an input signal and two pump signals are injected into an FWM medium. Bragg scattering within the FWM medium generates an idler signal having a frequency different from that of the input signal. The idler signal is then applied to a dispersive medium, which propagates the idler signal at a different, e.g., slower, speed than the propagation speed of the input signal through the dispersive medium, thereby resulting in a delay of the idler signal relative to the input signal as it progresses through, and especially at the far end of the dispersive medium. If desired, after transmission through the dispersive medium, the idler signal can be frequency converted back to the frequency of the original input signal via Bragg scattering in a second FWM medium.

Embodiments of the present invention can be used to perform bit-level switching of data encoded in the input signal. By using Bragg scattering (BS), embodiments of the present invention can provide optical buffering, i.e., delay, functions having one or more advantages over optical buffering achieved using the alternative FWM mechanism of modulation interaction (MI). In particular, unlike MI-based optical buffers:

- BS-based optical buffers can be tuned to generate different idler frequencies and therefore to provide different levels of time-shifting;
- BS-based optical buffers are suitable for use in WDM or other multiple-channel communication systems;
- BS-based optical buffers can be designed to generate high-quality output idlers by phase-modulating the pumps to suppress stimulated Brillouin scattering (SBS); and
- BS-based optical buffers are suitable for use in quantal as well as classical communication systems because BS converts signal photons into idler photons without adding noise photons.

In one embodiment, the present invention is an optical buffer comprising first and second pumps, a four-wave mixing (FWM) medium, and a dispersive medium. The first pump is adapted to generate a first pump signal at a first pump signal frequency, and the second pump is adapted to generate a second pump signal at a second pump signal frequency different from the first pump signal frequency. The FWM medium is adapted to (i) receive an input signal and the first and second pump signals and (ii) perform Bragg scattering (BS) so that at least some of the input signal is frequency converted into an idler signal having a frequency different from a frequency of the input signal. The dispersive medium is adapted to receive the idler signal generated in the FWM medium, whereby the idler signal propagates at a speed different from the propagation speed of the input signal through the dispersive medium.

In another embodiment, the present invention is a method and apparatus for buffering an optical input signal. Bragg scattering is used to frequency convert an input signal into an idler signal having a frequency different from the frequency of the input signal. The idler signal is transmitted through a dispersive medium, whereby the idler signal propagates at a speed different from the propagation speed of the input signal through the dispersive medium.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

DETAILED DESCRIPTION

Figure 1:
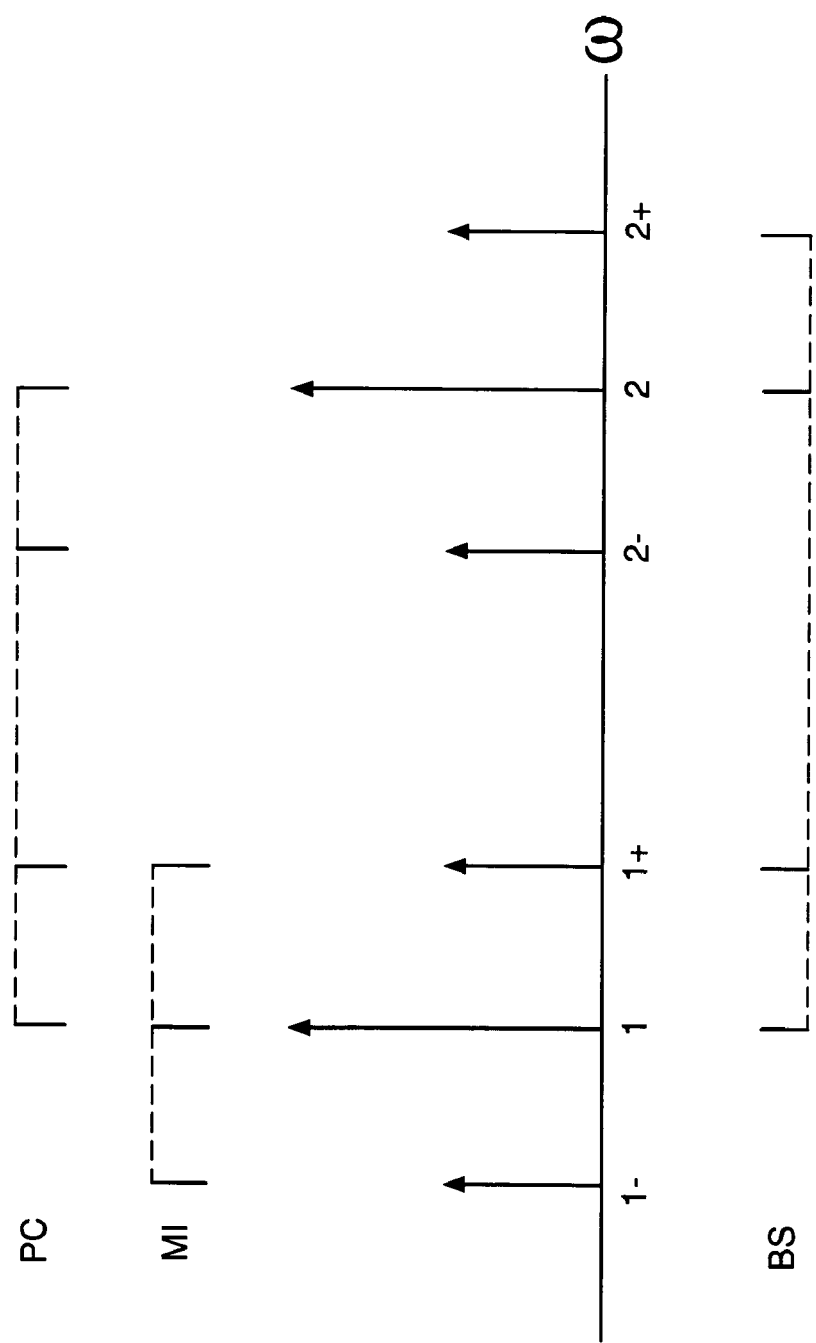
FIG. 1 illustrates three different types of four-wave mixing (FWM): modulation interaction (MI), phase conjugation (PC), and Bragg scattering (BS), which is also referred to as frequency conversion (FC).
Figure 2:
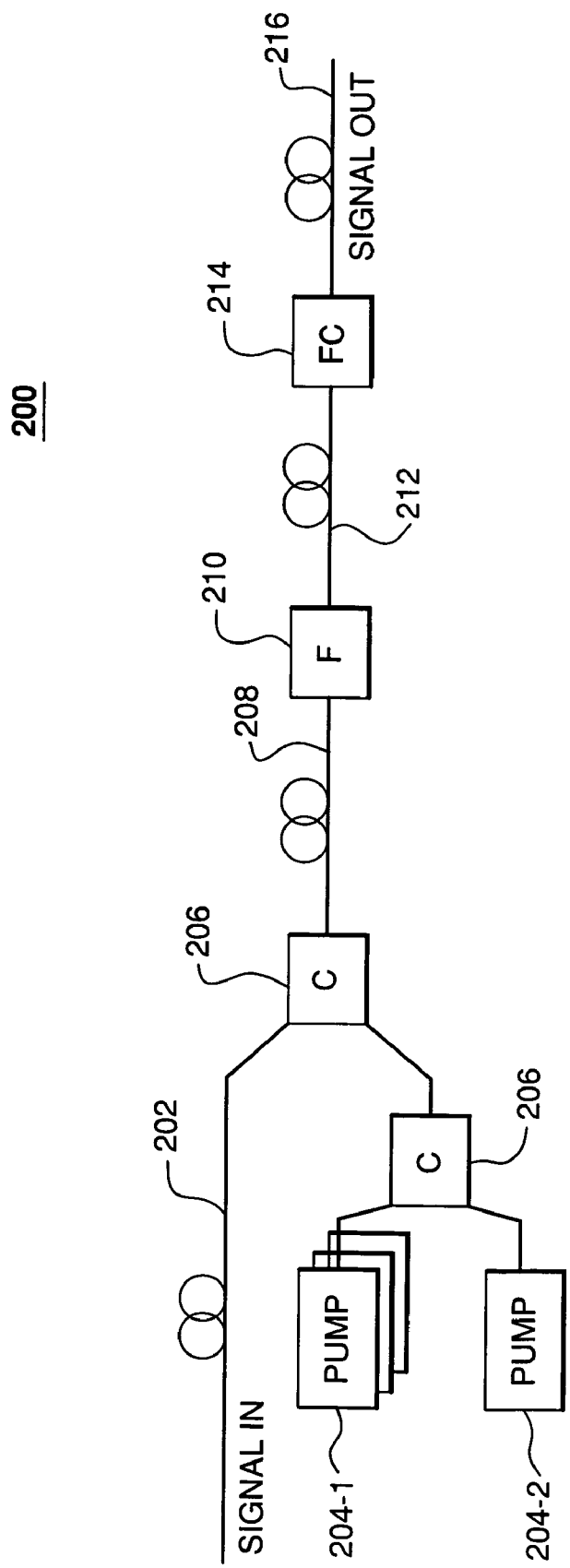
FIG. 2 shows a block diagram of an optical buffer according to one embodiment of the present invention.

FIG. 2 shows a block diagram of an optical buffer 200, according to one embodiment of the present invention. Optical buffer 200 comprises two pumps 204-1 and 204-2, two couplers 206, four-wave-mixing (FWM) fiber 208, filter 210, dispersive fiber 212, and (optional) frequency converter 214. In the context of FIG. 1, couplers 206 combine pump waves $\omega_1$ and $\omega_2$ from pumps 204-1 and 204-2, respectively, with input signal $\omega_{1+}$ from input fiber 202 for transmission through FWM fiber 208. Note that the two two-way couplers 206 could be replaced by a single three-way coupler. FWM fiber 208 is any suitable fiber that supports Bragg scattering (BS), such as a suitable highly nonlinear fiber (HNF) or a photonic crystal fiber (PCF). To provide high-efficiency BS-based frequency conversion, FWM fiber 208 and the pump wave frequencies are selected such that $\omega_0$, the zero-dispersion frequency (ZDF) of the fiber, is approximately equal to $(\omega_{1+}+\omega_2)/2$.

Within FWM fiber 208, BS converts some (if not substantially all) of input (data) signal $\omega_{1+}$ into idler signal $\omega_{2+}$, where $\omega_{2+}=(\omega_{1+}+\omega_2-\omega_1)$. Filter 210 selects idler signal $\omega_{2+}$ for transmission through dispersive fiber 212. As known in the art, the speed at which an optical signal propagates through a dispersive fiber is a function of the signal frequency. As a result of the signal-to-idler frequency conversion from $\omega_{1+}$ to $\omega_{2+}$, the time that it takes for the idler signal $\omega_{2+}$ to propogate through dispersive fiber 212 will be different from the time that it would have taken the original input signal $\omega_{1+}$ to propagate through dispersive fiber 212, with the magnitude of the time difference (i.e., delay) being substantially proportional to the frequency difference ($\omega_{2+}-\omega_{1+}$).

If desired, idler signal $\omega_{2+}$ can be frequency converted back to the frequency of input signal $\omega_{1+}$ using frequency converter 214, which can (but does not have to) employ Bragg scattering using elements analogous to elements 204-210. In that case, the resulting output signal applied to output fiber 216 would be an identical, albeit relatively time-shifted, version of the original input signal. Note that, in general, whether the time-shifted output signal is a delayed version or an advanced version of the input signal depends on (1) the sign of the signal-to-idler frequency change and (2) the sign of the dispersion coefficient (i.e., whether higher-frequency signals propagate faster or slower through the dispersive fiber). Note further that, in applications where the output signal can remain in the idler frequency $\omega_{2+}$, frequency converter 214 can be omitted.

In one possible operating scenario, one of pumps 204 is a continuous-wave (CW) pump that is operated continuously, and the other pump is a pulsed pump that is operated intermittently, where the BS-based frequency conversion occurs only when both pumps are on. In this way, optical buffer 200 can be used to selectively delay portions of input signal $\omega_{1+}$ (i.e., bits of information) relative to other portions of that input signal by selectively turning on and off the pulsed pump. Note that, in alternative implementations, both pumps can be pulsed pumps.

Bit-level switching employing FWM was demonstrated at 10 and 40 Gb/s by S. Radic, C. J. McKinstrie, R. M. Jopson, A. H. Gnauck, J. C. Centanni, and A. R. Chraplyvy, "Multi-band bit-level switching in two-pump fiber parametric devices," IEEE Photon. Technol. Lett. 16, 852-854 (2004), and by Q. Lin, R. Jiang, C. F. Marki, C. J. McKinstrie, R. M. Jopson, J. E. Ford, G. P. Agrawal, and S. Radic, "40-Gb/s optical switching and multicasting in a two-pump parametric device," IEEE Photon. Technol. Lett. 17, 2376-2378 (2005), the teachings of both of which are incorporated herein by reference. The experiments described in these papers involved a CW pump, whose frequency was in the normal dispersion regime, and a pulsed pump, whose frequency was in the anomalous dispersion regime. When the anomalous pump was off, the signal was not amplified and no idler was generated. When the anomalous pump was on, the signal was amplified and three idlers were generated. Because the anomalous pump can be turned on and off in a small fraction of the bit period (e.g., a few ps), selected bits can be frequency converted without affecting their neighbors. Similar remarks apply if the anomalous pump is CW and the normal pump is pulsed, or if both pumps are pulsed.

Referring again to FIG. 2, if pump 204-1 is CW pump and pump 204-2 is a pulsed pump that is selectively turned on and off at bit intervals, then, depending on the amount of time-shifting provided by dispersive fiber 212, one group of one or more consecutive bits in the input signal can be shifted in time relative to another group of one or more consecutive bits in the input signal. For example, assume that the order of two consecutive bits (Bit A followed by Bit B) in input signal 202 needs to be reordered such that Bit A follows Bit B in output signal 216. In that case, optical buffer 200 can be designed and operated such that:

(1) Pulsed pump 204-2 is off during Bit A in input signal 202 to allow Bit A to pass through FWM fiber 208 without being frequency converted and then propagate through dispersive fiber 212 at signal frequency $\omega_{1+}$. Note that, in this implementation, filter 210 is designed to select signal frequency $\omega_{1+}$ as well as idler frequency $\omega_{2+}$ (although no idler is generated in this situation); and (2) Pulsed pump 204-2 is on during Bit B in input signal 202 to frequency convert Bit B from signal frequency $\omega_{1+}$ to idler frequency $\omega_{2+}$ in FWM fiber 208, in which case Bit B propagates through dispersive fiber 212 at a different speed from Bit A. For this application, dispersive fiber 212 is designed to propagate higher frequencies faster than lower frequencies, such that Bit B propagating at idler frequency $\omega_{2+}$ overtakes Bit A propagating at signal frequency $\omega_{1+}$ within dispersive fiber 212 and arrives at frequency converter 214 ahead of Bit A.

Note that, if dispersive fiber 212 propagates higher frequencies slower than lower frequencies, then Bits A and B can be re-ordered by turning on pulsed pump 204-2 during Bit A and turning off pulsed pump 204-2 during Bit B. Note further that, if the time shifting is sufficiently large, then two groups of bits, each having two or more consecutive bits, can be reordered within optical buffer 200.

Figure 3:
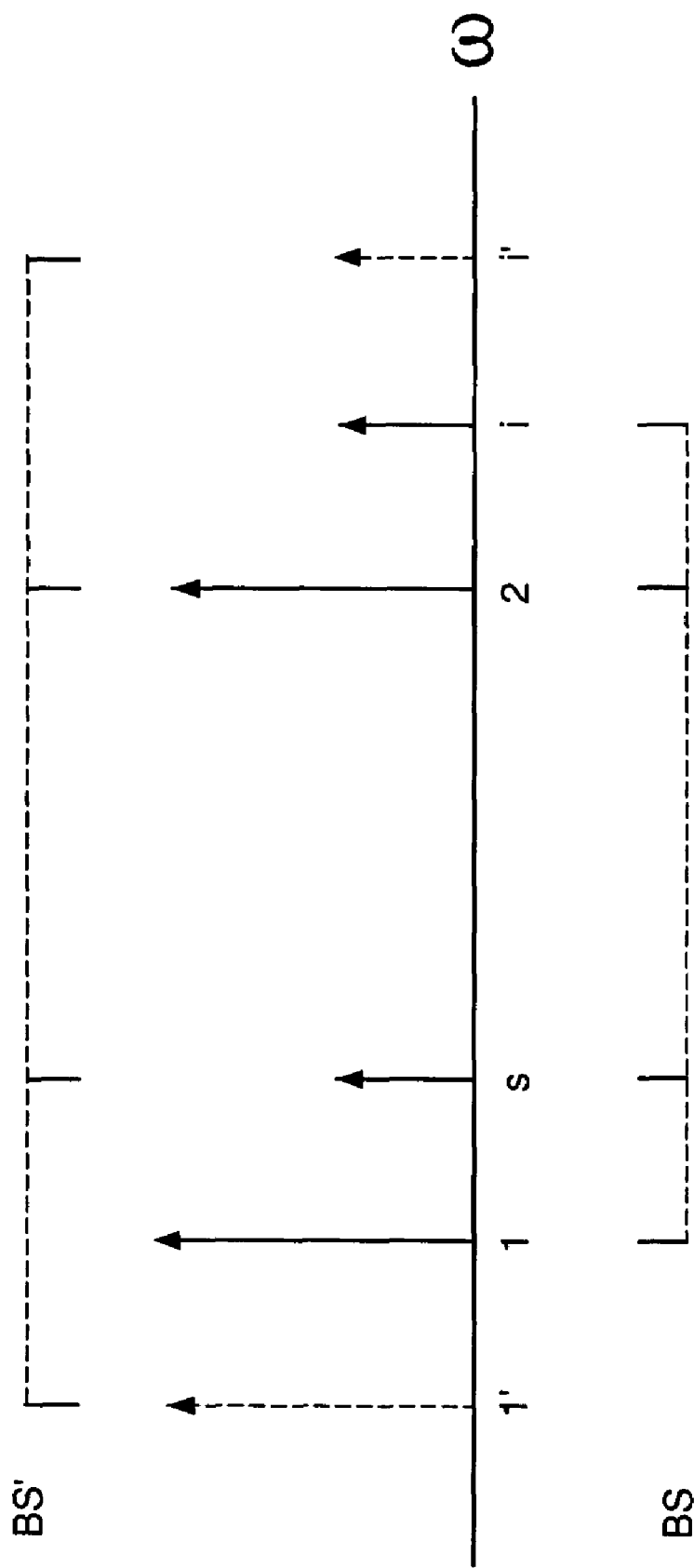
FIG. 3 shows that changing the frequency of a second pump signal changes the frequency of the idler signal generated by BS.

BS-based optical buffers, such as optical buffer 200 of FIG. 2, can be designed to provide certain advantages over MI-based optical buffers, such as those described by Sharping et al. For example, unlike MI-based optical buffers, BS-based optical buffers can be tuned to generate different idler frequencies and therefore to provide different levels of time-shifting. For a given FWM fiber 208 and a given input signal frequency $\omega_{1+}$, the BS condition (i.e., that the fiber ZDF $\omega_0$ be approximately equal to the average of the signal frequency $\omega_{1+}$ and the second pump frequency $\omega_2$), implies that the second pump frequency is (substantially) fixed. Note that there is no similar constraint on the first pump frequency $\omega_1$. This means that the idler frequency $\omega_{2+}$ can be varied by changing the first pump frequency $\omega_1$, where lower first-pump frequencies $\omega_1$ imply higher idler frequencies $\omega_{2+}$, as illustrated in FIG. 3. Since the magnitude of time-shifting is a function of the difference between the signal frequency $\omega_{1+}$ and the idler frequency $\omega_{2+}$, the size of the time shift provided by optical buffer 200 can be varied by altering the first pump frequency $\omega_1$ to change the idler frequency $\omega_{2+}$.

In one implementation, dispersive fiber 212 may be a single-mode fiber (SMF) having a positive delay coefficient of 17 ps/nm-Km. In another implementation, dispersive fiber 212 may be a dispersion-compensating fiber (DCF) having a delay coefficient of −200 ps/nm-Km. Assuming an available range of signal-to-idler wavelength differences from 0 to 30 nm, optical buffer 200 can be controlled (by varying pump frequency $\omega_1$) to produce delays ranging from 0 to 6 ns/Km, where the amount of delay depends on the length of the dispersive fiber. Larger signal-to-idler wavelength differences would result in even larger delays.

Pump frequency $\omega_1$ can be varied using a controllable pump, such as a tunable laser, for pump 204-1. Alternatively, pump 204-1 can be implemented using a plurality of pulsed pumps (as indicated in FIG. 2), each of which generates a pump wave having a different frequency. For a given optical buffer, different selected ones of the pulsed pumps can be turned on and off to achieve different corresponding levels of delay by selectively generating idler signals having different corresponding frequencies and therefore different corresponding propagation speeds through dispersive fiber 212 (as indicated in FIG. 3). These different levels of delay can be designed to correspond to different integer numbers of bit periods to selectively move bits around in the input signal by desired amounts of time, such that bit shuffling is possible.

Since the idler frequency $\omega_{2+}$ is equal to $(\omega_{1+}+\omega_2-\omega_1)$, signal-to-idler frequency difference $(\omega_{2+}-\omega_{1+})$ is equal to $(\omega_2-\omega_1)$, which does not depend on the signal frequency. As a result, signals in neighboring channels will experience (substantially) the same frequency shift in FWM fiber 208 and therefore (substantially) the same time delay in dispersive fiber 212. As such, unlike MI-based optical buffers, BS-based optical buffers are suitable for use in WDM or other multiple-channel communication systems.

As mentioned previously, in many parametric devices, the pumps are phase-modulated to suppress stimulated Brillouin scattering (SBS). For such phase-modulated pumps, let the pump frequencies be $(\omega_1+\delta\omega_1)$ and $(\omega_2+\delta\omega_2)$, where $\omega_1$ and $\omega_2$ are the average pump frequencies, which are constant, and $\delta\omega_1$ and $\delta\omega_2$ are the slowly-varying perturbations to the pump frequencies associated with phase modulation. Then, the idler frequency $\omega_{2+}$ equals $\omega_{1+}+(\omega_2+\delta\omega_2)-(\omega_1+\delta\omega_1)$. Spectral broadening of the BS idler can be prevented by co-phasing the phase-modulation schemes, such that $\delta\omega_1=\delta\omega_2$. See S. Radic, C. J. McKinstrie, R. M. Jopson, J. C. Centanni, A. R. Chraplyvy, C. G. Jorgensen, K. Brar, and C. Headley, "Selective suppression of idler spectral broadening in two-pump parametric architectures," IEEE Photonics Technology Letters, Vol. 15, No. 5, May 2003, the teachings of which are incorporated herein by reference. As a result, unlike MI-based optical buffers, BS-based optical buffers can be designed to generate high-quality output idlers.

BS converts signal photons into idler photons without adding noise photons. Under ideal conditions (i.e., 100% FC), the state of the output idler (i.e., after frequency conversion) is identical to the state of the input signal, albeit shifted in time.

As such, unlike MI-based optical buffers, BS-based optical buffers are suitable for use in quantal as well as classical communication systems.

There are special (niche) systems in which signal polarizations are controlled. In such systems, the pump and signal polarizations can be aligned to maximize the coupling between them and simplify the buffer designs. However, because transmission fibers are not polarization-maintaining, buffers for general (mainstream) systems should operate in a manner that does not depend on the polarizations of the input signals.

Most current FWM experiments involve highly nonlinear fibers (HNFs), which are single-mode fibers with small effective areas. They are randomly birefringent and not polarization-maintaining. BS in an HNF has been found to be a signal-polarization-dependent process. BS driven by co-rotating, circularly polarized pumps in a rapidly-spun fiber (RSF) has been shown to be a polarization-independent process. Some current experiments involve micro-structured fibers (MSFs), which are strongly birefringent and polarization-maintaining. BS in an MSF is a polarization-dependent process.

For niche systems, any of the aforementioned fibers could be used to produce BS. In contrast, for mainstream systems, only RSFs provide polarization invariance. If HNFs or MSFs are used to produce BS, then a polarization-diversity scheme should be used to provide polarization invariance.

At least two such polarization-diversity schemes originally designed for MI should also work for BS. In one scheme (described by T. Hasegawa, K. Inoue, and K. Oda, "Polarization independent frequency conversion by fiber four-wave mixing with a polarization diversity technique," IEEE Photon. Technol. Lett. 5, 947-949 (1993), the teachings of which are incorporated herein by reference), the pump and signal are sent through a polarization beam splitter (PBS), which splits the pump into two components of equal power (because the pump is polarized at 45 degrees to the polarization axes of the PBS) and sends them into a fiber loop, in opposite directions. The signal is also split into co- and counter-propagating components, each of which experiences the same amplification. When the signal components are recombined by the PBS, an output signal is produced, whose power does not depend on the polarization of the input signal.

In a related scheme (described by K. K. Chow, C. Shu, C. Lin, and A. Bjarklev, "Polarization-insensitive widely tunable wavelength converter based on four-wave mixing in a dispersion-flattened nonlinear photonic crystal fiber," IEEE Photon. Technol. Lett. 17, 624-626 (2005), the teachings of which are incorporated herein by reference), the loop is made of birefringent fiber, whose polarization axes are aligned with those of the PBS. In this scheme the co- and counter-propagating components of the pump and signal are aligned with the polarization axes of the birefringent fiber.

A similar outcome can be achieved by a pump that is polarized at 45 degrees to the axes of an open section (not a closed loop) of birefringent fiber. Birefringence tends to suppress interactions between waves with different polarization components (as discussed by C. J. McKinstrie, S. Radic, and C. Xie, "Phase conjugation driven by orthogonal pump waves in a birefringent fiber," J. Opt. Soc. Am. B 20, 1437-1446, (2003), the teachings of which are incorporated herein by reference). Each component of the pump drives an MI process with a co-polarized signal component. Because the coupling between these processes is weak, the power of the output signal depends only weakly on the polarization of the input signal.

Although the present invention has been described in the context of an input signal being at frequency $\omega_{1+}$ and an idler signal being at frequency $\omega_{2+}$, those skilled in the art will understand that the invention is not so limited. In general, as long as the BS condition (i.e., that the average of the input signal frequency and the "opposing" pump frequency is approximately equal to the FWM fiber's ZDF) is satisfied, an optical buffer can be designed such that any one of the four sideband frequencies ($\omega_{1-}$, $\omega_{1+}$, $\omega_{2-}$, and $\omega_{2+}$ of FIG. 1) is the input signal frequency and a corresponding one of the two "opposing" sideband frequencies is the idler signal frequency. For example, if $\omega_{2+}$ of FIG. 1 were the input signal frequency and if $\omega_0 \approx (\omega_1+\omega_{2+})/2$, then $\omega_{1+}$ would be the BS idler frequency. Similarly, if $\omega_{1-}$ were the input signal frequency and if $\omega_0 \approx (\omega_{1-}+\omega_2)/2$, then $\omega_{2-}$ would be the BS idler frequency. Lastly, if $\omega_{2-}$ were the input signal frequency and if $\omega_0 \approx (\omega_1+\omega_{2-})/2$, then $\omega_{1-}$ would be the BS idler frequency.

Although the present invention has been described in the context of optical buffers having an FWM fiber and a dispersive fiber, optical buffers of the present invention could, in principle, be implemented using FWM media and/or dispersive media other than fibers. As used herein, the term "FWM medium" refers to any suitable medium that supports Bragg scattering. Similarly, as used herein, the term "dispersive medium" refers to any suitable medium in which the light propagation speed varies with signal frequency.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

I claim:

1. A method for buffering an optical input signal, the method comprising:

using Bragg scattering (BS) to frequency convert an input signal into an idler signal having a frequency different from the frequency of the input signal; and transmitting the idler signal through a dispersive medium, whereby the idler signal propagates at a speed different from the propagation speed of the input signal through the dispersive medium, wherein:
the frequency conversion is implemented in a four-wave mixing (FWM) medium having a zero-dispersion frequency (ZDF) approximately equal to the average of the input signal frequency and a first pump signal frequency;
the FWM medium is adapted to perform BS for different values of a second pump signal frequency.

2. The invention of claim 1, wherein:
the method further comprises the step of varying the second pump signal frequency to generate, for each different value for the first pump signal frequency, an idler signal having a different frequency and a different propagation speed through the dispersive medium.

3. The invention of claim 1, wherein the BS is implemented using first and second pump signals and further comprising selectively turning on and off at least one of the first and second pump signals to selectively perform the BS to selectively frequency convert the input signal into the idler signal.

4. The invention of claim 3, wherein the at least one pump signal is turned on and off to provide bit-level switching for the input signal.

5. The invention of claim 1, wherein the input signal comprises two or more input channels, wherein the two or more input channels are frequency converted into two or more idler channels having substantially identical signal-to-idler frequency differences.

6. The invention of claim 1, wherein the first and second pump signals are phase modulated to suppress stimulated Brillouin scattering, wherein the phase modulation of the first and second pump signals is co-phased to inhibit spectral broadening of the idler signal.

7. A method for buffering an optical input signal, the method comprising:
using Bragg scattering (BS) to frequency convert an input signal into an idler signal having a frequency different from the frequency of the input signal; and
transmitting the idler signal through a dispersive medium, whereby the idler signal propagates at a speed different from the propagation speed of the input signal through the dispersive medium, wherein the input signal comprises two or more input channels, wherein the two or more input channels are frequency converted into two or more idler channels having substantially identical signal-to-idler frequency differences.

8. The invention of claim 7, wherein the input signal is a wavelength-division-multiplexed signal.

\* \* \* \* \*